July 7, 1959  L. O. HEGSTAD  2,893,416
PRESSURE RESPONSIVE REVERSING VALVE
Filed Aug. 20, 1956  2 Sheets-Sheet 1
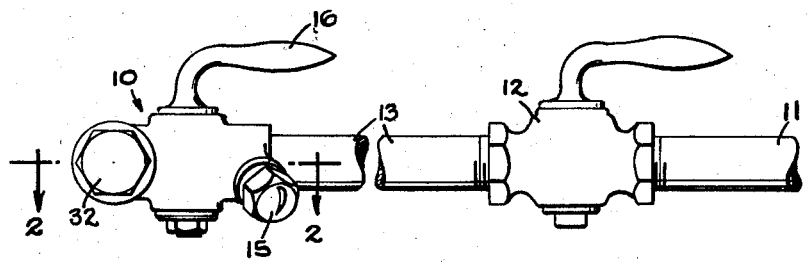
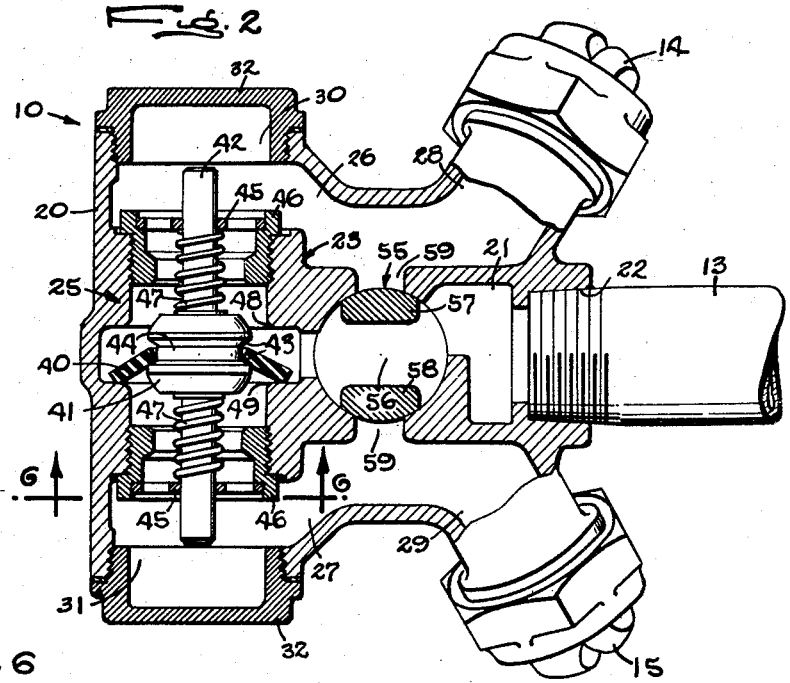
INVENTOR
Lester O. Hegstad
ATTORNEY

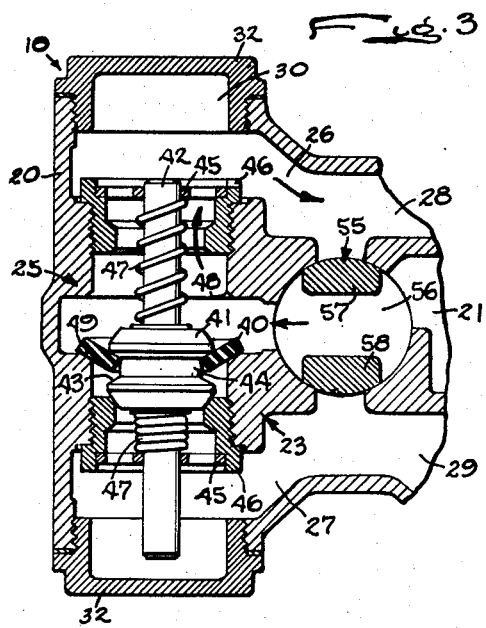

United States Patent Office 2,893,416
Patented July 7, 1959

2,893,416

PRESSURE RESPONSIVE REVERSING VALVE

Lester O. Hegstad, Roscoe, Ill., assignor to Hanson Equipment Company, South Beloit, Ill., a corporation of Illinois Application August 20, 1956, Serial No. 605,168

12 Claims. (Cl. 137—119)

This invention relates to fluid valves and more particularly to a pressure responsive automatic reversing valve.

Agricultural spraying equipment is conventionally capable of spraying outwardly from each side of the tractor or other vehicle upon which it is mounted, enabling a wide swath to be covered in a single "pass" of the vehicle. However, when it is necessary to spray while a stiff crosswind is blowing it is desirable to spray only with, and not into, the wind. For this reason, each time the vehicle reaches an end of the area to be sprayed and turns around, the spraying nozzle on the side that was spraying with the wind must be turned off for it then aims into the breeze, while the nozzle on the opposite side of the vehicle that was facing to the windward and is now aimed downward must be turned on. With spraying equipment being normally carried on booms out of the operator's convenient reach, turning the nozzles on and off has been a time consuming and annoying job. In normal spraying operations, whether the nozzles on each side of the vehicle are alternately actuated or not, the operator inherently cuts off the spraying equipment when the edge of the area to be sprayed is reached before swinging the vehicle around and alining it with the next swath to be sprayed on the return trip. Since the spraying equipment is normally shut off and then restarted each time the vehicle is turned, it is obviously advantageous to permit this action to automatically reverse the nozzle actuation when such alternate actuation is desired. A single operation can thus produce both desired results.

It is an object of the invention to provide a reversing valve that will alternately direct fluid through one and then the other of two outlets automatically in response to changes in fluid pressure. It is a more particular object to provide a reversing valve operable to direct fluid through either of two passages that automatically opens one passage and closes the other each time fluid pressure to the valve is cut off.

In one of its aspects it is an object to provide an attachment for agricultural spraying equipment that will permit either spraying from both sides of a conveying vehicle or will automatically alternate the spraying from one side to the other in response to momentarily stopping the spray, as when the vehicle is being turned around. It is a correlated object to provide an agricultural spraying assembly having an attachment as characterized above and which is arranged so that the spray may be momentarily stopped by a control convenient to the operator and remote from the spraying nozzle.

It is a more detailed object to provide an automatic reversing valve, controlled by the incoming fluid pressure, having an overcentering snap action which positively positions the valve so as to direct fluid through either of two outlets. It is a further object to provide a valve of the above character that is simple and effective, which has few movable parts and therefore is trouble-free in operation and economical to manufacture.

Other objects and advantages of the invention will become apparent upon reading the attached detailed description and upon reference to the drawings in which:

Figure 1 is an elevation view of a valve constructed according to the invention installed in a spraying assembly.

Fig. 2 is a sectional view taken along line 2—2 of Fig. 1.

Fig. 3 is similar to Fig. 2 with the parts in a second sequential position.

Fig. 4 is similar to Fig. 2 with the parts in a third sequential position.

Fig. 5 is similar to Fig. 2 with the parts in a fourth sequential position.

Fig. 6 is a sectional view taken along line 6—6 in Fig. 2.

Fig. 7 is similar to Fig. 2 with the by-pass valve blocking the reversing assembly.

While the invention will be described in connection with a preferred embodiment, it will be understood that I do not intend to limit the invention to the embodiment, but, on the contrary, intend to cover such alternative embodiments and constructions as may be included within the spirit and scope of the appended claims.

Turning first to Fig. 1, there is shown a reversing valve 10 constructed according to the invention utilizing in an agricultural spraying installation. The valve 10 carries two oppositely disposed and outwardly directed spraying nozzles 14 and 15, the nozzle 15 being visible in Fig. 1. The nozzles are adapted to be positioned on a tractor or other conveying vehicle so that the spray from the nozzles is directed outwardly from each side of the vehicle. Leading from a source of fluid under pressure, not shown, is pipe 11 connected to an on-off valve 12 that is intended to be positioned within the convenient reach of the vehicle operator. Connecting the on-off valve 12 to the reversing valve 10 and the spraying nozzles is a pipe 13. Ordinarily the spray head will be located at a position relatively close to the ground, rearwardly of the vehicle and thus remote from the operator, thus the pipe 13 may be of any required length and configuration. A handle 16 extends from the top of valve 10. It will suffice at this point to say that the handle conditions the valve for automatic remote operation as well as for continuous operation of both nozzles when desired.

When the reversing valve 10 is in automatic operation it is effective, when the fluid pressure is turned on, to direct fluid only toward one nozzle and to block the opposite nozzle. Thus, when the operator turns the valve 12 on, the spray is directed outwardly from only one side of the vehicle and the valve 10 acts to block the opposite nozzle. In the act of blocking that nozzle, the valve is automatically predisposed in such a manner that when the operator cuts off the fluid pressure by operating the on-off valve 12, the reverse valve 10 is oppositely conditioned so that when the pressure is restored, fluid is directed toward the formerly blocked nozzle and blocked from the formerly open nozzle. Therefore, when the operator momentarily turns valve 12 off and then on again, the spray stops and then is resumed from the opposite side of the vehicle. Incident to this switch the valve is automatically predisposed so that when the fluid pressure is next cut off the valve 10 is conditioned as was first described and a full cycle is completed.

The valve 10 comprises a housing 20 having an inlet passage 21 leading from a threaded opening 22 to a sub-housing 23 which encloses the reversing assembly 25. Two outlet passages 26 and 27 lead from opposite sides of the sub-housing to outlet openings 28 and 29 respectively, upon which are threaded nozzles 14 and 15.

In accordance with the present invention, a reversing assembly is provided within the valve that includes a shiftable sealing member that is alternatively positionable so as to shift and block one outlet passage or the other under the influence of incoming fluid pressure, and which, when shifting to block one passage, is automatically oppositely conditioned so that when the fluid is next turned on the opposite passage will be blocked. In the present embodiment the sealing member comprises an annular two-position resilient washer or diaphragm 40 composed of neoprene or the like. The washer 40 is fitted on an annular support or plunger 41 which in turn is carried intermediate a short shaft 42. The plunger 41 has two spaced shoulder portions 43 which confine the washer 40 to an intermediate, substantially cylindrical section 44. Supporting the shaft 42 for sliding movement are two perforated disks 45, best shown in Fig. 6, which have a center hole providing a bearing for each end of the shaft 42. The disks 45 are mounted in annular plugs 46 which in turn are threaded into the outlet openings of the sub-housing 23. Two identical coil springs 47 surround the shaft 42, one bearing on each side of the support 41, and are slightly compressed by the disks 45 so that there is balanced resilient force urging the support 41 to its center position, shown in Fig. 2.

Prior to a more detailed discussion of the structure and operation, more detailed attention should be given to the washer 40. In accordance with one of the main aspects of the invention the sealing member or washer 40 is designed to assume one or the other of its two positions on its shiftable support with a positive, overcentering snap movement that is simply and effectively produced. The inner diameter of the washer 40, which comprises the sealing member, is slightly less than the diameter of cylindrical section 44 of support 41 onto which it is stretched. Thus the washer seeks to avoid remaining in a uniform plane and tends to slope toward one side or the other; that is, to assume the Fig. 2 or the Fig. 4 position. To accentuate this overcentering tendency of the washer 40 it has been found effective to slightly round the surface of section 44 so that it is not truly cylindrical but more nearly represents a lateral section cut from a sphere.

Cooperating with the washer 40 to close the outlet passages are annular shoulders 48 and 49 formed on the inside of sub-housing 23. When the washer slopes toward shoulder 49, as in Fig. 2, the valve is conditioned to deflect fluid toward passage 26. When the washer slopes toward shoulder 48, as in Fig. 4, the valve is conditioned to deflect fluid toward passage 27. It can thus be noted that washer 40 can occupy either of two positions on support 41, either that of Fig. 2 or Fig. 4, and that in each of these positions the valve is conditioned to direct incoming fluid toward one outlet passage or the other. The introduction of fluid under pressure through the valve inlet passage 21 causes the support 41 and the washer 40 to shift toward the shoulder, either 48 or 49, which the washer 40 had been sloping toward, much in the manner of a piston. This shift firmly urges the washer 40 against the shoulder so as to seal its associated passage and also predisposes the washer on the support to its alternative position. For example, with the washer in its Fig. 2 position sloping toward shoulder 49, the admission of fluid under pressure would cause the support 41 and the washer 40 to be urged against the force of the balanced springs 47 to the position shown in Fig. 3. The shift of support 41 relative to shoulder 49 blocks passage 27 while leaving passage 26 open and also causes the washer 40 to assume its second position so that when the fluid pressure is relaxed and the springs 47 again center the support 41, the washer will slope toward shoulder 48, as shown in Fig. 4. When the fluid is again admitted to the valve it will urge the support and washer toward shoulder 48 and the relative movement between the support 41 and the shoulder 48 will again predispose the washer 40 to its former position as shown in Fig. 5. It will be noted that when the support 41 and washer 40 shift from their middle position toward either one of the outlet passages, the engagement of either of the shoulders 48 or 49 with the washer need only overcenter the washer and then it snaps positively into its alternate position.

According to one of the features of the invention, the shiftable sealing member not only conditions the valve so that one outlet passage or the other will be closed when fluid pressure is admitted but also seals that passage under non-operating conditions so that the first inrush of fluid does not escape before the sealing member shifts to block the outlet. That is, washer 40 actually engages the shoulder toward which it slopes. As shown in Fig. 2, washer 40 engages shoulder 49 and seals the passage 27 against the fluid which forces the washer and its support 41 to the final blocking position shown in Fig. 3. In a similar fashion, washer 40 engages shoulder 48 when in its Fig. 4 position.

In keeping with the invention, the valve 10 includes means operated by handle 16 to selectively bypass the reversing assembly 25 and cause the incoming fluid to be directed toward each of the outlet passages 26 and 27 simultaneously for spraying on both sides of the vehicle at the same time. In the illustrated embodiment this means takes the form of a rotatable core 55 which is cylindrical and has a passage 56 extending therethrough, partially enclosed by wall portions 57 and 58. Two openings 59 are oppositely disposed and extend through the walls of the passages 26 and 27 to bypass the reversing assembly 25. The handle 16 is attached to the core 55 so that it may be conveniently rotated through the angle $a$ between the position shown in Fig. 2 and that shown in Fig. 7. In Fig. 2 the passage 56 formed in core 55 connects inlet passage 21 to the interior of sub-housing 23 while wall portions 57 and 58 block-off openings 59. This permits the valve to function as an automatic reversing valve. In Fig. 7 the wall portion 57 blocks the opening to sub-housing 23 and passage 56 permits fluid from inlet passage 21 to flow through openings 59 into each of the outlet passages 26 and 27 so that the valve 10 does not perform its automatic reversing function.

According to one of the detailed features of the invention, access to the interior of housing 20 for purposes of assembly and repair is provided by two threaded openings 30 and 31 which are oppositely disposed and alined with the reversing assembly 25. These openings are normally closed by threaded caps 32.

To briefly summarize the operation of a valve constructed according to the invention, the valve 10 will be considered as installed in an agricultural spraying assembly. The operator may turn handle 16 so that core 55 is in its Fig. 7 position and inlet passage 21 is directly connected to outlet passages 26 and 27. Thus, when the spraying pump is turned on, the liquid will be ejected through each of the nozzles 14 and 15. When the operator wishes to spray from alternate sides of the conveying vehicle, as when it is moving back and forth in a strong cross wind, the handle 16 is turned to dispose core 55 in its Fig. 2 or automatic position. When the spraying pump is turned on, the liquid will flow into sub-housing 25 and enter the passage left open by washer 40 and out of the associated nozzle. The pressure of the fluid will cause the support 41 to shift and the relative movement of the support and the shoulder against which washer 40 is sealed will cause the washer to overcenter and snap into its alternative position. When the vehicle reaches the edge of the area to be sprayed, the operator shuts off the spray pressure and turns the vehicle about. As soon as the pressure on the washer and support is cut off, the springs 47 center the support 41, and the washer opens the formerly sealed outlet passage and closes the formerly open one so that when the vehicle is again started back over the area to be sprayed and the pressure is turned on the liquid will be discharged from the opposite nozzle. In summary, when using this mode of operation the operator simply operates the convenient on-off valve 12 and it is not necessary for him to dismount at the end of each row. It should be noted that the reversing action occurs when the fluid pressure within the valve 10 exceeds the centering force of springs 47. Therefore, these springs can be selected so that the fluid supply must be almost completely cut off and the pressure drop to zero before the valve reverses, or stronger springs can be utilized so that a relatively slight drop in fluid pressure will cause the valve to reverse.

I claim as my invention:

1. A pressure responsive reversible valve comprising a hollow body having two alined outlet passages and an inlet opening intermediate said outlet passages for admitting fluid under pressure to the interior of the body, a shiftable diaphragm adapted to seal either one of said passages, a shiftable support for carrying said diaphragm between said passages, said diaphragm being positionable on said support so as to condition the support and diaphragm for movement by fluid pressure toward one or the other of said passages, means to resiliently position said support between said outlet passages, and means cooperating with said support when the support and diaphragm are carried toward either one of said passages to reposition the diaphragm so that when the fluid pressure is interrupted, and said means resiliently positions the support, the support and diaphragm will be conditioned to move toward the opposite outlet passage.

2. A pressure responsive reversible valve comprising two alined outlet passages, an inlet opening intermediate said outlet passages for admitting fluid under pressure, an annular resilient washer adapted to seal either one of said passages, a slidable cylindrical support extending through said washer to carry it between said passages, said washer having a smaller inner diameter than the diameter of the support on which it is carried so that the washer will overcenter and slope toward one of said passages at a time and thereby condition the support and diaphragm for movement by fluid pressure in the direction of the passage toward which it slopes, means to resiliently position said support between said outlet passages, and means cooperating with said support when the support and washer are carried toward either one of said passages to engage and overcenter the washer so that when the fluid pressure is interrupted, and said means resiliently positions the support, the support and washer will be conditioned to move toward the opposite outlet passage.

3. A pressure responsive reversible valve comprising two alined outlet passages, an inlet opening intermediate said outlet passages for admitting fluid under pressure, a shiftable diaphragm adapted to seal either one of said passages, a shiftable support for carrying said diaphragm between said passages, said diaphragm being positionable on said support to close said passages one at a time when the support is intermediate the passages and thereby condition the support and diaphragm for movement by fluid pressure toward the closed passage, means to resiliently position said support between said outlet passages, and means cooperating with said support when the support and diaphragm are carried toward either one of said passages to reposition the diaphragm so that when the fluid pressure is interrupted, and said means resiliently positions the support, the diaphragm will close the opposite passage and thereby be conditioned to move toward the opposite outlet passage.

4. A pressure responsive reversible valve comprising two alined outlet passages, an inlet opening for admitting fluid under pressure intermediate said outlet passages, a shiftable diaphragm adapted to seal either one of said passages, a slidable piston for carrying said diaphragm between said passages, said diaphragm being positionable on said piston to snap into either of two positions in which the diaphragm and piston close one or the other of said passages when the piston is intermediate the passages and thereby condition the piston and diaphragm for movement by fluid pressure toward the closed passage, means to resiliently position said piston between said outlet passages, and means cooperating with said piston when the piston and diaphragm are carried toward one of said outlet passages to snap the diaphragm into its alternative position so that when the fluid pressure is interrupted, and said means resiliently positions the piston, the piston and diaphragm will be conditioned to move toward the opposite outlet passage.

5. A pressure responsive reversible valve comprising, in combination, a housing having an inlet opening and two outlet passages arranged in symmetrical T-formation, a movable diaphragm member arranged between the two outlet passages, supporting means for mounting the diaphragm member for axial movement between two positions in which it blocks either one of said outlet passages while opening the other for fluid flow from the inlet, and means tending resiliently to center said supporting means relative to said outlet passages, said diaphragm being mounted for limited axial movement on said supporting means so that it is moved into one of its limit positions thereon incident to blocking off fluid flow, and upon cutting off fluid pressure and return of the supporting means to its centered position, the diaphragm member will be predisposed to move in the opposite direction upon reapplication of fluid pressure to the inlet.

6. A pressure responsive reversible valve comprising two opposed outlet passages, a support shiftable between the two outlets, means to resiliently position said support intermediate said outlets, a valving element carried by said support and movable relative thereto between two positions, means resiliently urging said element into either of said two positions with an overcenter action, said element, when in each of said positions and when said support is intermediate said outlets, operating to close a different one of the outlets, an inlet opening to introduce fluid under pressure intermediate said outlets and thus shift the support toward the outlet that is closed by the valving element, and means to cause the valving element to snap into its opposite position as an incident to said shift of the support.

7. A pressure responsive reversible valve comprising a hollow body having two opposed outlet passages, a generally cylindrical support shiftable on said body between said passages, means to resiliently position said support intermediate said passages, a flat annular resilient valving element carried by said support, said element being stretched to surround said support so that the element will overcenter and slope axially of the support to close one or the other of said outlets when the support is intermediate the two outlets, means on said body defining an inlet opening to introduce fluid under pressure to the interior of the body intermediate said passages and shift the support toward the passage that is closed by the valving element, and means to cause the valving element to overcenter and snap into its opposite position incident to said shift of the support.

8. For use with agricultural spraying equipment, a valve assembly comprising, in combination, a valve housing having an inlet opening to admit fluid under pressure and two outlet passages, a selector valve adapted to alternately close one of said outlet passages and open the other automatically each time pressure at said inlet opening is momentarily interrupted, and a by-pass valve within said housing having an element movable between two positions and operable in one position to connect said inlet opening to the selector valve and, in the other position, to bypass the selector valve and connect said inlet directly to the two outlet passages.

9. A pressure responsive reversing valve having, in combination, a hollow body having oppositely disposed outlet passages and an inlet opening for admitting pressure fluid to the interior of the body, a support mounted on said body to shift back and forth toward and away from the respective outlet passages and resiliently urged toward an intermediate position between the passages, means on said body defining valve seats surrounding the respective outlet passages, and a valve element mounted on said support for limited movement back and forth relative thereto between two positions in each of which, when the support is in said intermediate position, the element is disposed adjacent a different one of said seats and cooperates with such seat and the support to close the associated passage at least partially and direct pressure fluid from said inlet opening through the other passage, said support shifting toward the closed one of said passages and said element shifting from the corresponding one of its positions to the other position in response to admission of pressure fluid through said inlet opening whereby, when the fluid pressure is interrupted and the support has returned to said intermediate position, the element then is disposed adjacent the other of said seats to direct pressure fluid through the previously closed passage the next time pressure fluid is admitted through the inlet opening.

10. The valve defined in claim 9 in which said support comprises a generally cylindrical piston having an external groove therein intermediate its ends and secured to an intermediate portion of a supporting rod of smaller diameter slidable axially on said body and said valve element is the outer periphery of an annular resilient washer having its inner periphery seated in said groove and smaller in diameter than the bottom of the groove for shifting of the outer periphery back and forth between its two positions relative to the piston with an overcenter snap action.

11. In a spraying system, the combination of a hollow body having an inlet passage and two outlet passages, a fluid supply line connected to said inlet passage and adapted for connection to a source of fluid under pressure, an on-off valve located in said supply line at a point remote from said body, and a selector valve within said body cooperating with each of said outlet passages to alternately close off one of said outlet passages and open the other automatically for fluid flow to such other outlet passage from said inlet passage each time fluid pressure to said selector valve is interrupted by closing said on-off valve.

12. A pressure responsive valve comprising, in combination, a hollow body having two spaced outlet passages and an inlet passage, means on said body adjacent said outlet passages defining valve seats, a valve element mounted on said body to move back and forth between spaced positions of engagement with the respective seats and cooperating with each seat while in engagement therewith to close the associated outlet passage while leaving the other outlet passage open for the flow of pressure fluid from said inlet passage and out of said body through the other passage, a supply line connected to said inlet passage and adapted for connection to a source of fluid under pressure, an on-off valve located in said supply line between said source and said inlet passage, and valve actuating means responsive to changes of fluid pressure within said body and operable to shift said valve element alternately from each of said positions to the other in response to an increase of the fluid pressure due to opening of said on-off valve followed by interruption of the pressure when the on-off valve is closed.

References Cited in the file of this patent

UNITED STATES PATENTS

| | | |
|---|---|---|
| 589,124 | Evertsen | Aug. 31, 1897 |
| 2,314,860 | Lenin | Mar. 23, 1943 |
| 2,651,491 | Ashton et al. | Sept. 8, 1953 |
| 2,769,454 | Bletcher et al. | Nov. 6, 1956 |